(12) United States Patent
Sparks, II et al.

(10) Patent No.: US 12,729,080 B2
(45) Date of Patent: Sep. 8, 2026

(54) SOLAR PANEL VACUUM LIFTER AND TRAILER CONNECTABLE TO A HOST PIECE OF EQUIPMENT

(71) Applicant: Vacuworx Global, LLC, Tulsa, OK (US)

(72) Inventors: Keith A. Sparks, II, Tulsa, OK (US); Trevor Bowman, Tulsa, OK (US); Justin Hendricks, Tulsa, OK (US)

(73) Assignee: Vacuworx Global, LLC, Tulsa, OK (US)

( * ) Notice: Subject to any disclaimer, the term of this patent is extended or adjusted under 35 U.S.C. 154(b) by 341 days.

(21) Appl. No.: 18/606,978

(22) Filed: Mar. 15, 2024

(65) Prior Publication Data

US 2024/0308790 A1 Sep. 19, 2024

Related U.S. Application Data

(60) Provisional application No. 63/490,811, filed on Mar. 17, 2023.

(51) Int. Cl.

| | |
|---|---|
| ***H02S 20/00*** | (2014.01) |
| ***B65G 67/04*** | (2006.01) |
| ***B66F 9/12*** | (2006.01) |
| ***B66F 9/16*** | (2006.01) |

(52) U.S. Cl.
CPC .................................... *B65G 67/04* (2013.01)

(58) Field of Classification Search
CPC ......... B65G 67/04; H02S 20/00; Y02E 10/47; B66C 1/0243; B66C 1/0212; B66F 9/065; B66F 9/0655; B66F 9/181; B66F 9/16; B66F 9/12; B60P 3/1033; B60P 1/435; B60P 1/43; B60P 1/02; B60P 3/40
See application file for complete search history.

(56) References Cited

U.S. PATENT DOCUMENTS

| | | | | |
|---|---|---|---|---|
| 10,654,395 B1 * | 5/2020 | White | ........................ | B60P 1/16 |
| 2012/0027550 A1 * | 2/2012 | Bellacicco | ................ | B60P 3/14 414/547 |
| 2017/0120794 A1 * | 5/2017 | Muegerl | ................... | B66F 9/06 |
| 2017/0292337 A1 * | 10/2017 | White | ..................... | B60P 3/035 |
| 2022/0297957 A1 | 9/2022 | Watts | | |
| 2024/0025703 A1 * | 1/2024 | Matesich | .............. | B66C 1/0256 |

FOREIGN PATENT DOCUMENTS

NZ 211016 A 11/1987

* cited by examiner

*Primary Examiner* — Saul Rodriguez
*Assistant Examiner* — Jaimin G Patel
(74) *Attorney, Agent, or Firm* — GableGotwals

(57) ABSTRACT

Embodiments of a solar panel trailer (10) of this disclosure include a fixed frame (20) having a pair of tilt hinges (55) at a forward end (21); a tilting frame (70) having forks (83) and connected to the pair of tilt hinges; a pair of lifting cylinders (140) having a piston end (141) and a rod end (143), the piston end connected to the fixed frame, the rod end connected to a corresponding one of the pair of tilt hinges, and a pair of vertically oriented clamps (120) located at a rearward end (31) of the trailer, an open end (121) of each clamp facing away from the rearward end; the tilting frame tilting the pair of lifting cylinders extend and retract. The trailer may be accompanied by a vacuum lifter (150) including a slewing bearing (151); at least two spring-loaded, disc-shaped vacuum pads (153); and vacuum pump (155).

10 Claims, 17 Drawing Sheets

SOLAR PANEL VACUUM LIFTER AND TRAILER CONNECTABLE TO A HOST PIECE OF EQUIPMENT

CROSS-REFERENCE TO CO-PENDING APPLICATIONS

This application claims priority to U.S. 63/490,811 filed Mar. 17, 2023.

BACKGROUND

This disclosure relates systems, methods, and apparatuses designed to handle solar panels intended for installation onto frames or racks that, after the panels' installation, provide multiple rows or arrays of solar panels, the arrays being used as a system to generate electricity.

Solar panels typically arrive at the installation site arranged in palletized bundles of vertically oriented panels. Because the palletized panel orientation is 90° off from that needed for installation, each solar panel in a bundle must be manually removed from the bundle and then reoriented horizontally for lifting and placement onto the frame or rack. The process is labor intensive and can result in damage to the panels.

Prior art methods intended to reduce the labor-intensive nature of this task include tipping the pallet 90° in a preparation area and then transferring the now horizontally oriented panels to a transport deck such as a flat bed trailer. Transferring the pallet to the transport deck may be done by pallet handling equipment such as a front end loader or crane equipment. The pallets are then placed in rows on the transport deck, the transport deck being parked parallel to the frame or array. A lifting head having a plurality of suction devices may be used to simultaneously lift the top solar panel from each pallet of the row. The lifting head is suspended from a crane or boom of a lifting vehicle such as an excavator that trails with the transport deck, the lifting head being substituted for the excavator bucket. See U.S. Pat. No. 11,772,913 B2 to Watts.

SUMMARY

Embodiments of this disclosure include a vacuum lifter having a vacuum pump connectable to a power circuit of a host piece of equipment and a trailer including one end connectable to the host piece of equipment and having another end including a frame having forks. The frame with forks is pivotable through 90° by lifting cylinders connectable to a power circuit of the host piece of equipment. The vacuum lifter includes a slewing bearing and at least two spring-loaded, disc-shaped, vacuum pads each in fluid circuit relation with the vacuum pump.

The end of the trailer connectable to the host piece of equipment may include clamps adapted or sized for connection to a blade of the host piece of equipment. In some embodiments, the trailer includes an extension that provides the clamps.

The vacuum lifter may be suspended from a vacuum lifting attachment of the host piece of equipment. In some embodiments, the vacuum lifting attachment is a fixed or telescoping boom. The vacuum lifter may be connected to the boom by a pin.

The host piece of equipment may be an excavator. In other embodiments, the host piece of equipment is a skid steer. The host piece of equipment may be wheeled or tracked. The electrical power circuit may comprise a battery of the host piece of equipment. The hydraulic fluid circuit includes a hydraulic pump of the host piece of equipment.

ELEMENTS AND NUMBERING USED IN THE DRAWINGS

Figure 1:
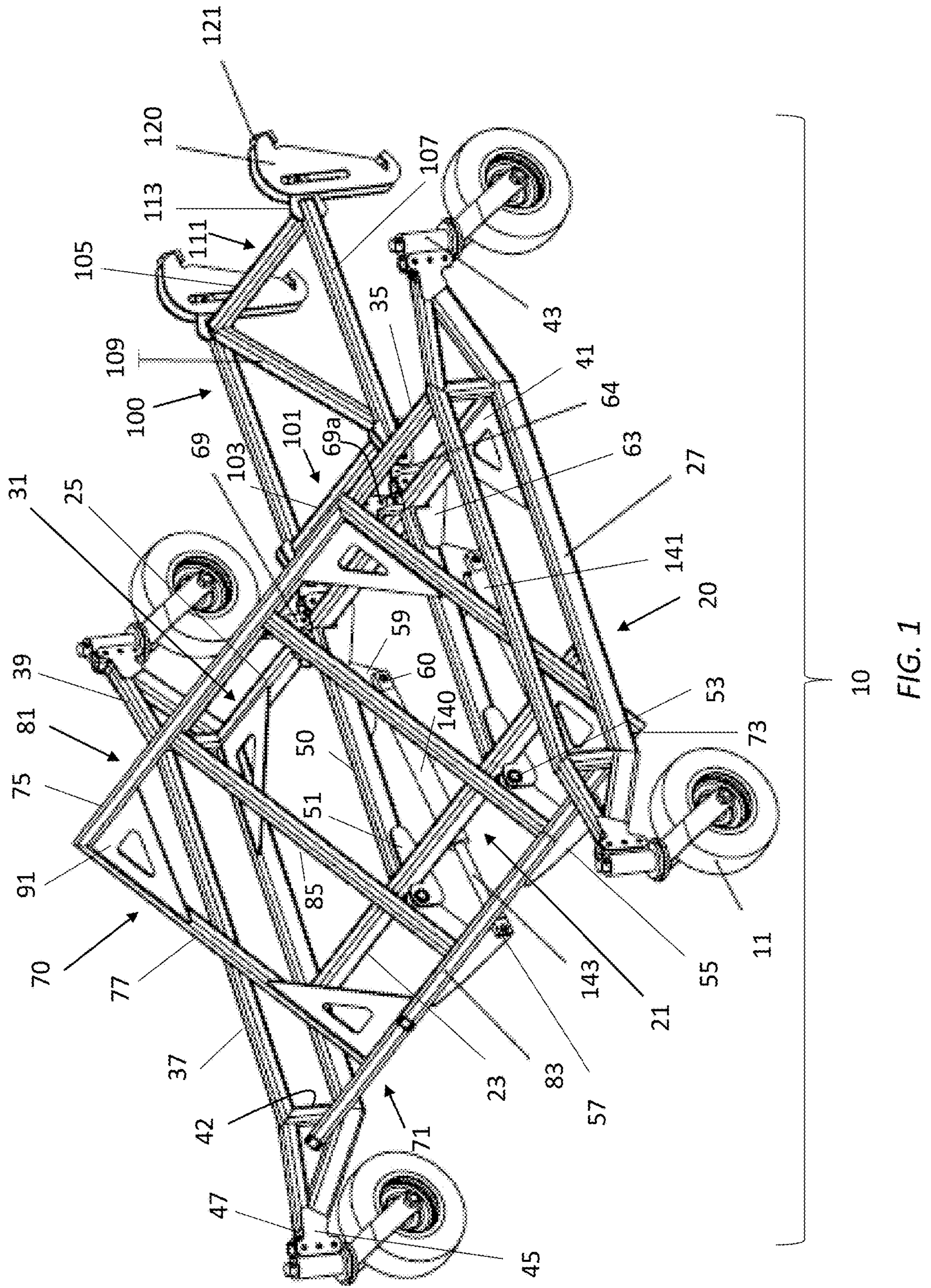
FIG. 1 is an isometric view of an embodiment of a trailer of this disclosure as a tilting frame of the trailer transitions between vertical and orientation. The forward end of the frame includes forks for engaging with a palletized bundle of solar panels. The rearward end of the trailer includes a pair of clamps for connection to a blade of the host piece of equipment.
Figure 2C:
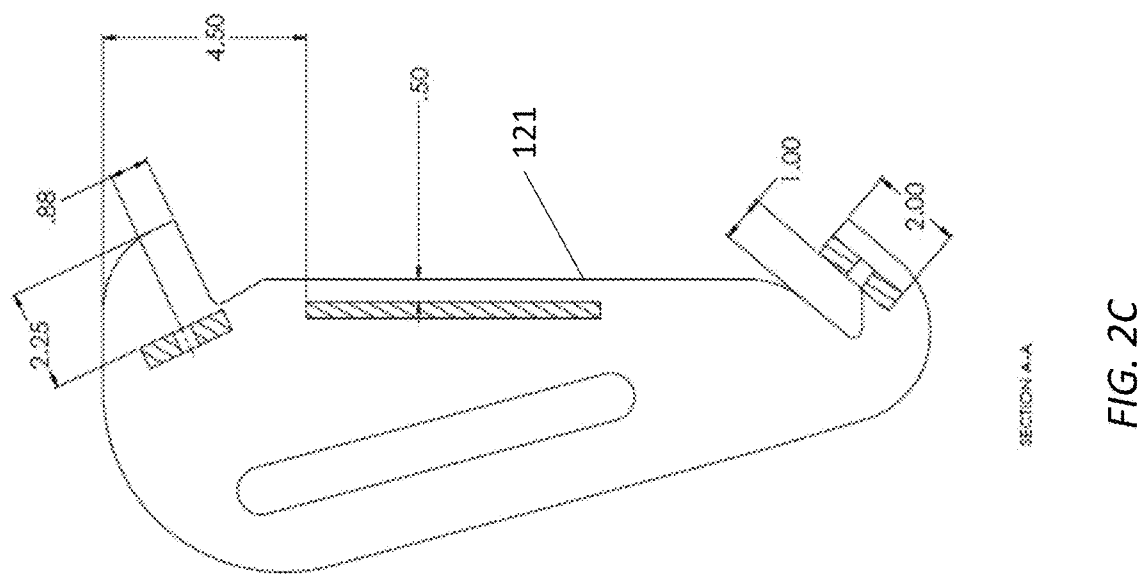
FIG. 2C is a cross-section view of the clamp taken along section line 2C-2C of FIG. 2B.
Figure 2B:
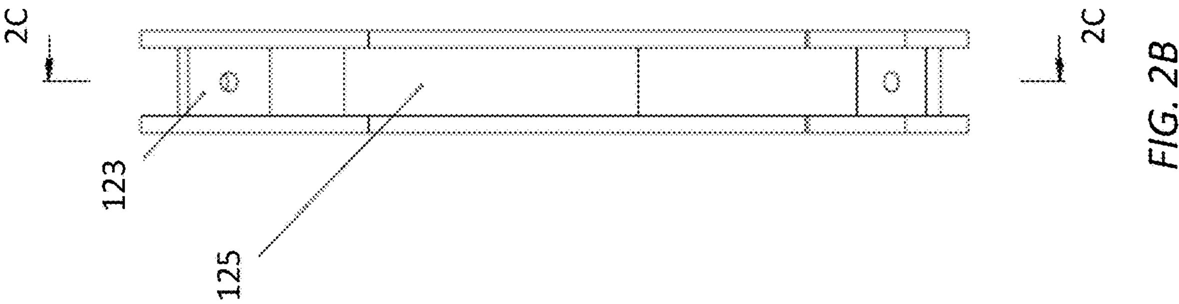
FIG. 2B is a front elevation view of the clamp of FIG. 2A.
Figure 2A:
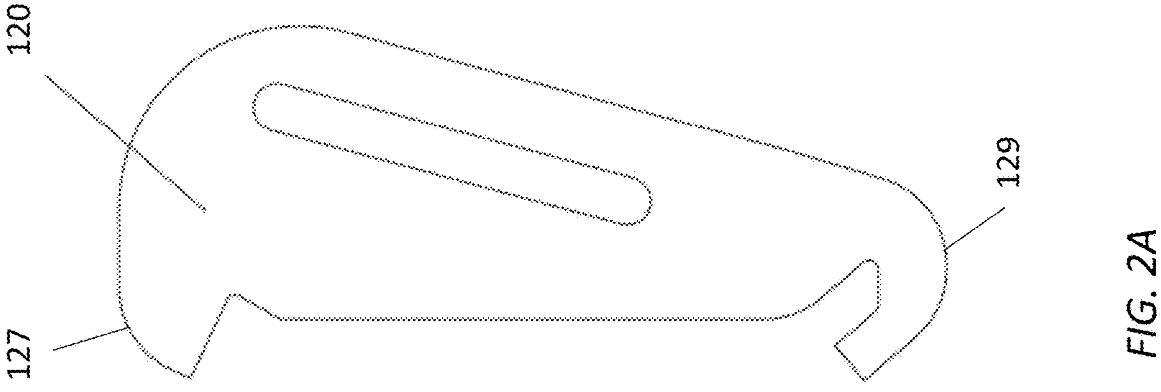
FIG. 2A is a side elevation view of an embodiment of a clamp of this disclosure.
Figure 3:
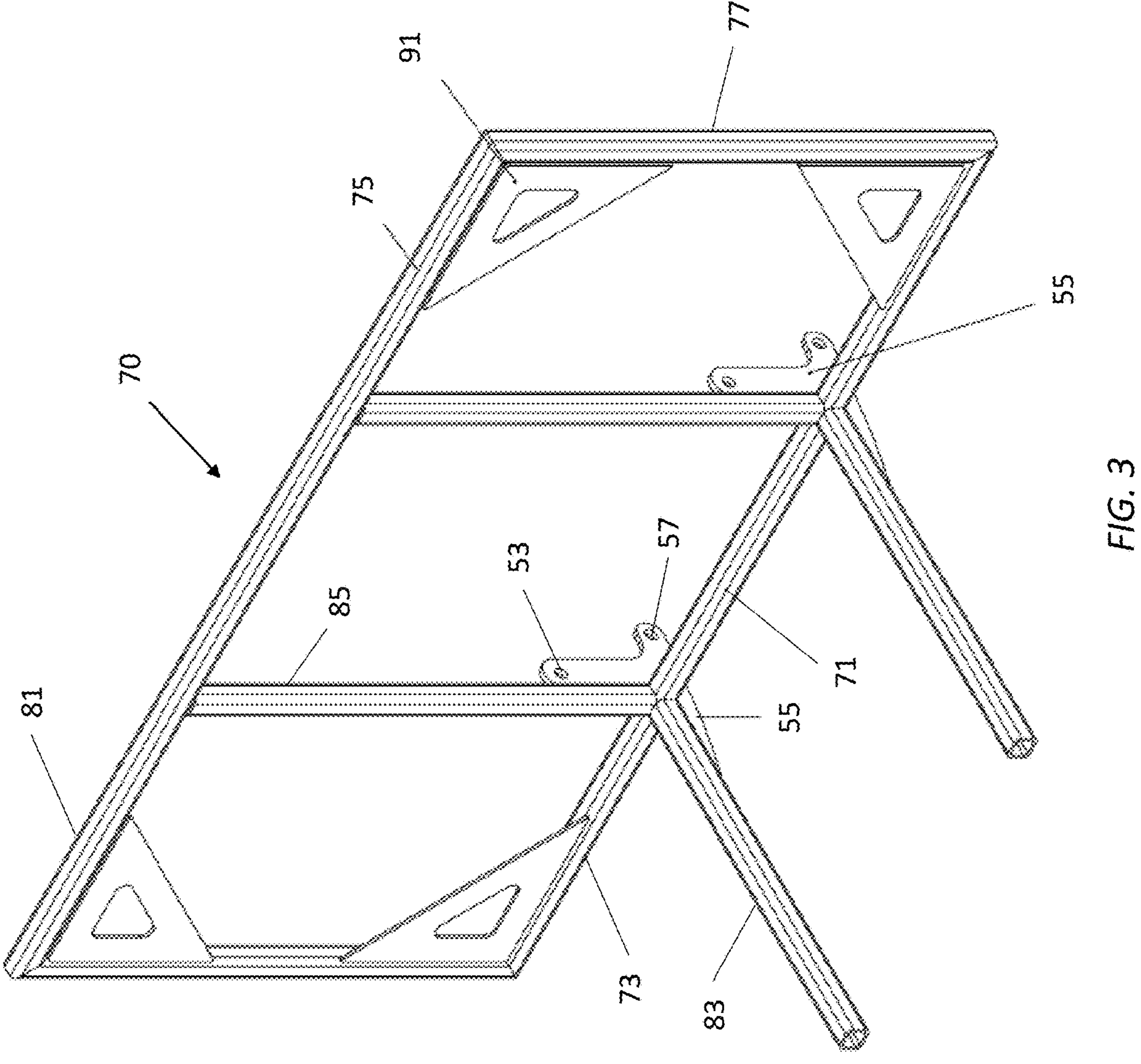
FIG. 3 is an isometric view of an embodiment of the tilting frame with forks.
Figures 4A, 4B:
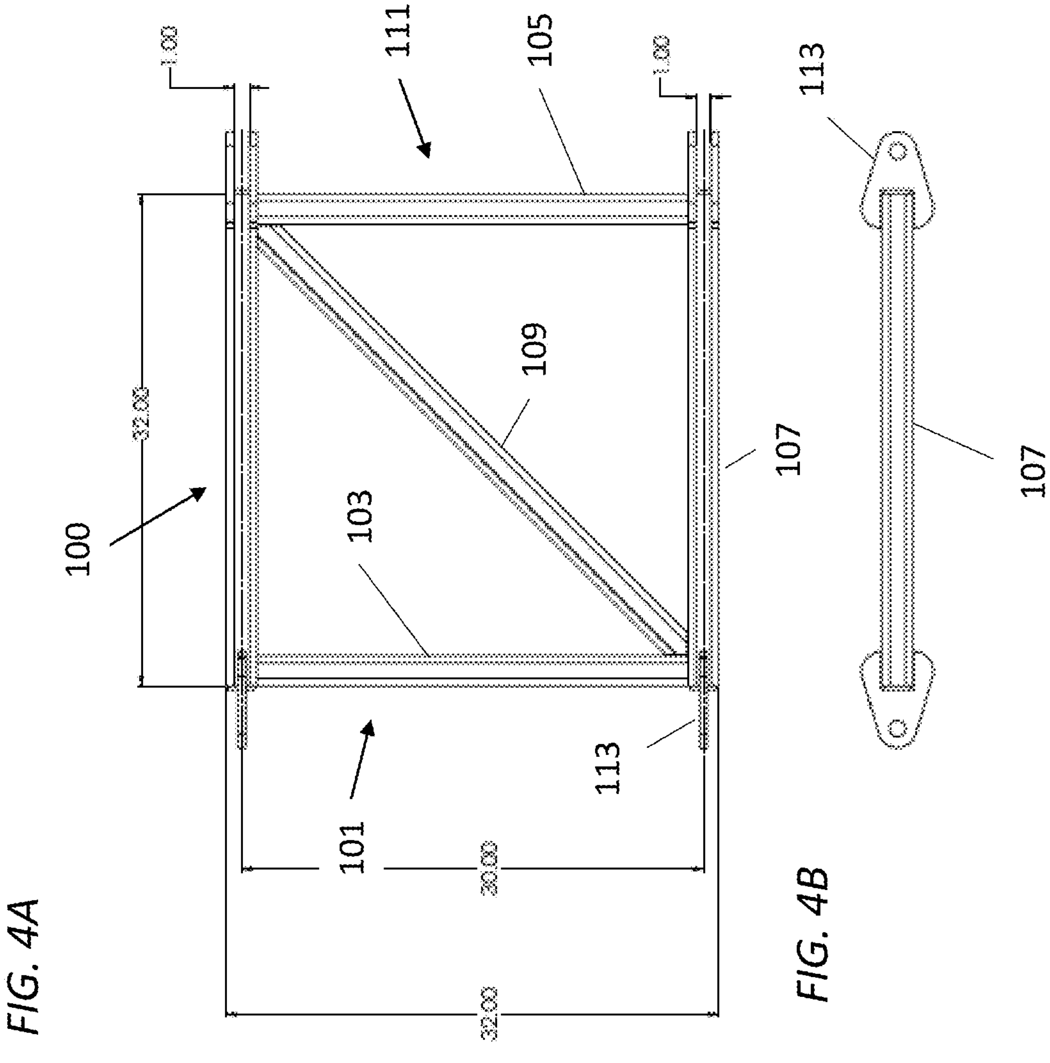
FIG. 4A is a top plan view of an embodiment of a trailer extension of this disclosure.
FIG. 4B is front elevation view of the trailer extension.
Figure 5:
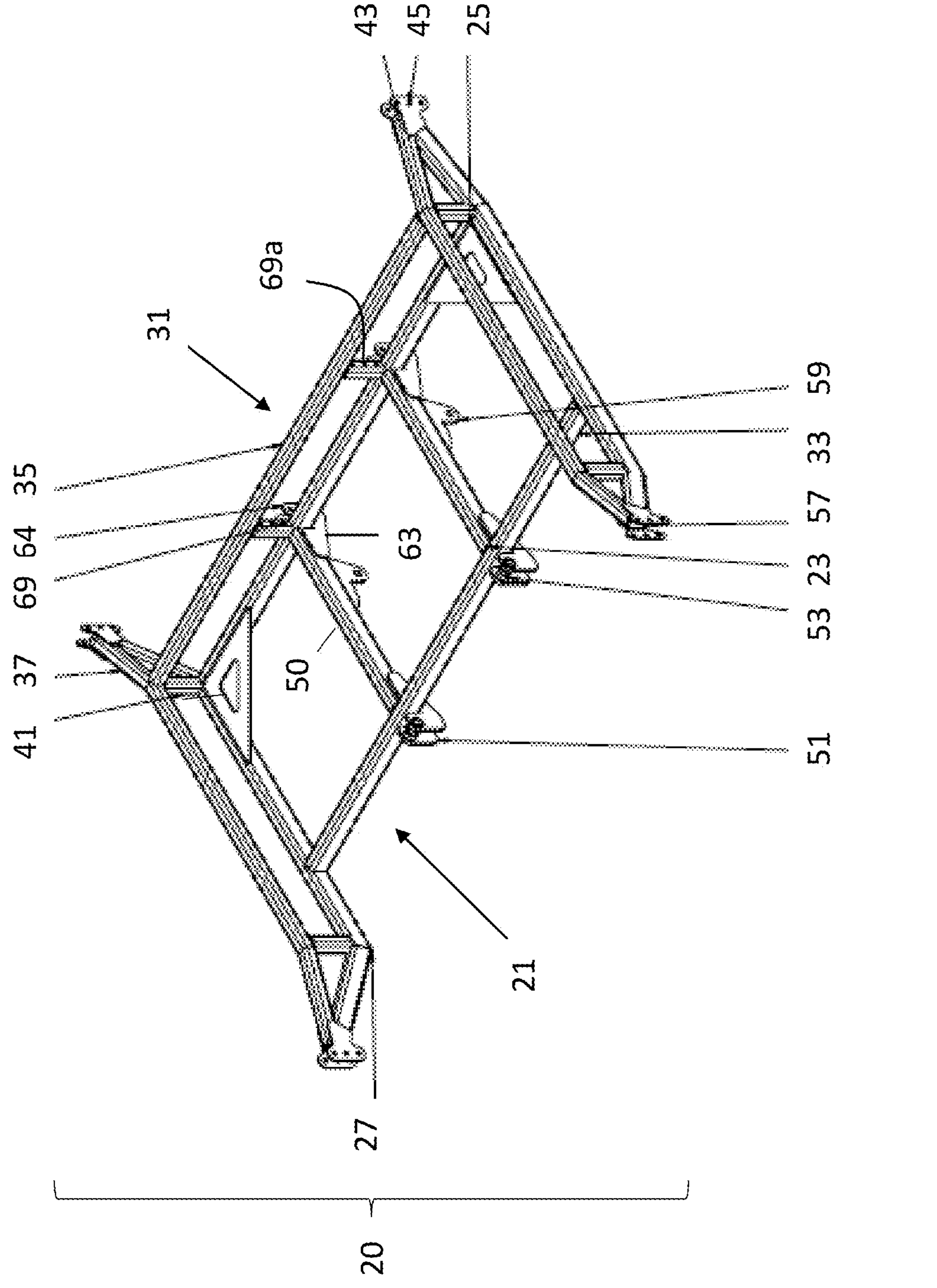
FIG. 5 is an isometric view of an embodiment of the fixed trailer frame weldment of this disclosure.
Figure 6:
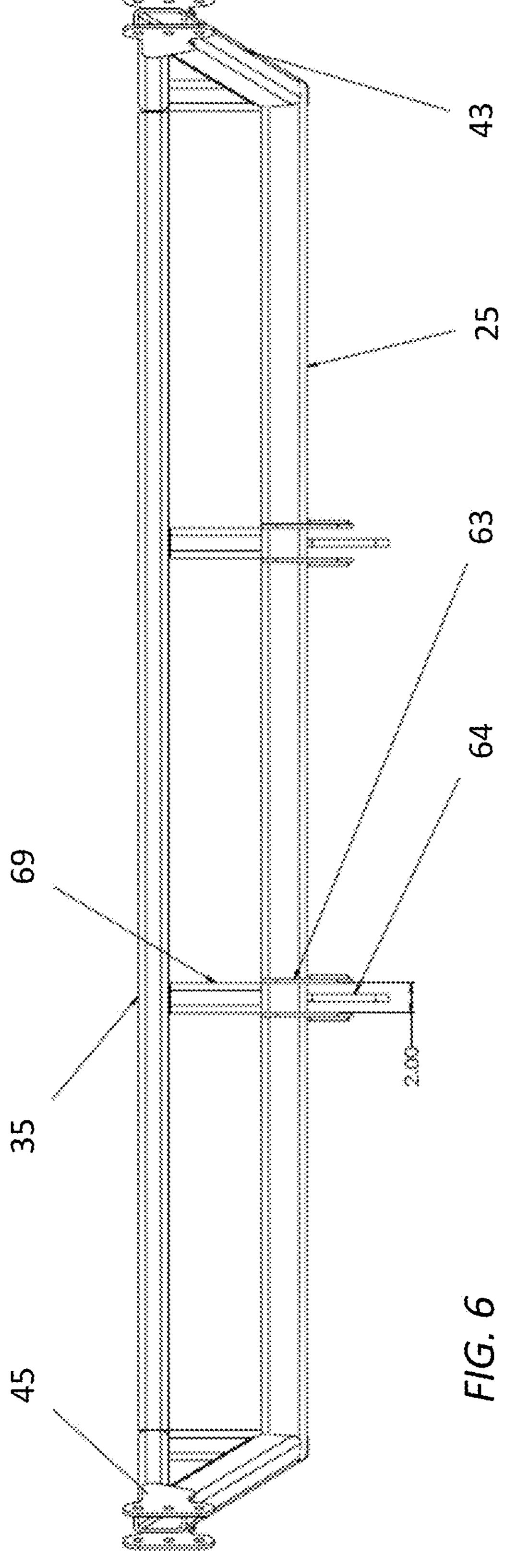
FIG. 6 is an end (rear or host equipment-facing end) elevation view of the fixed trailer frame weldment of FIGS. 1 and 5.
Figures 7, 8:
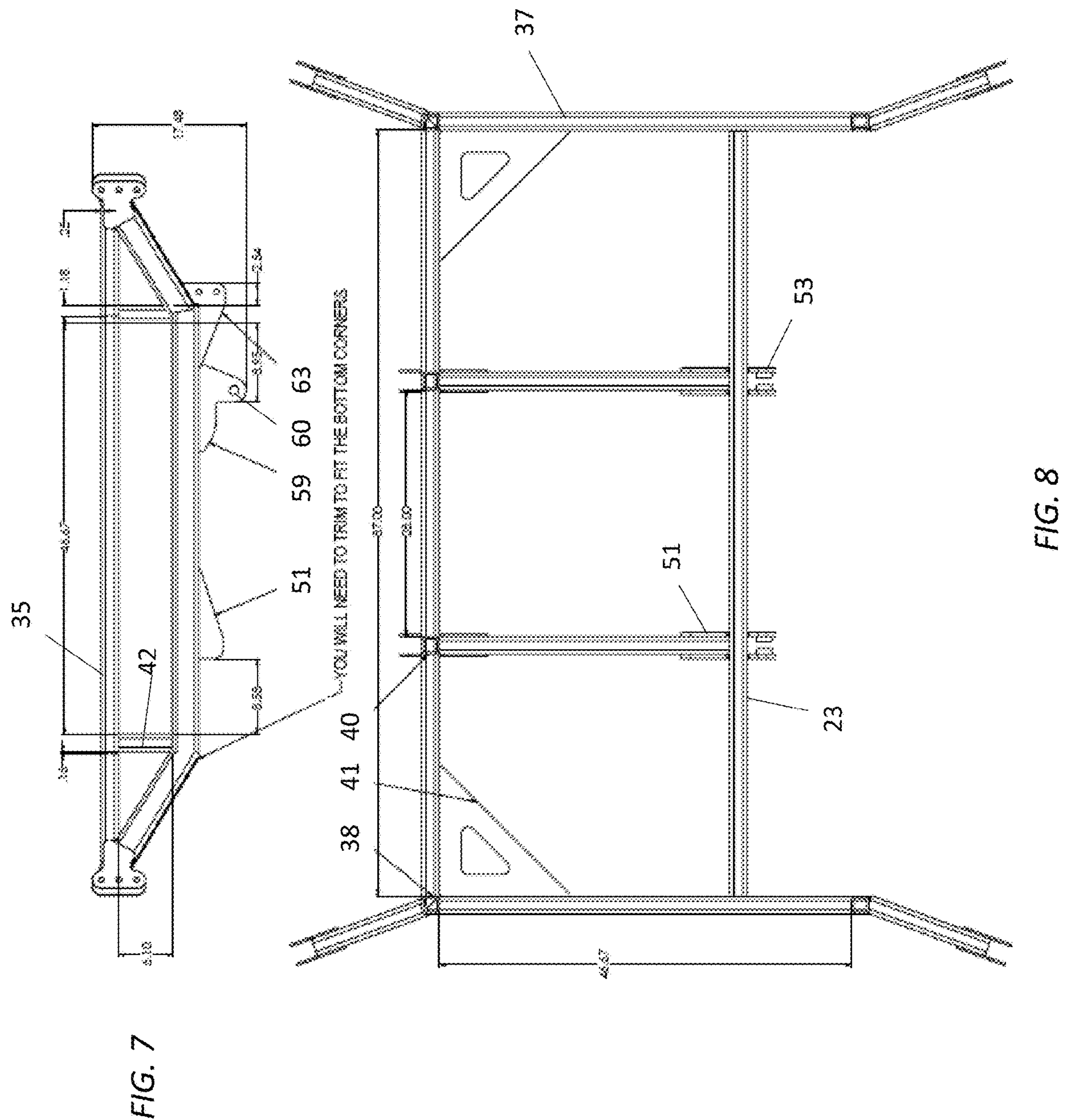
FIG. 7 is a side elevation view of the trailer frame weldment.
FIG. 8 is a top plan view of the trailer frame weldment.
Figure 9:
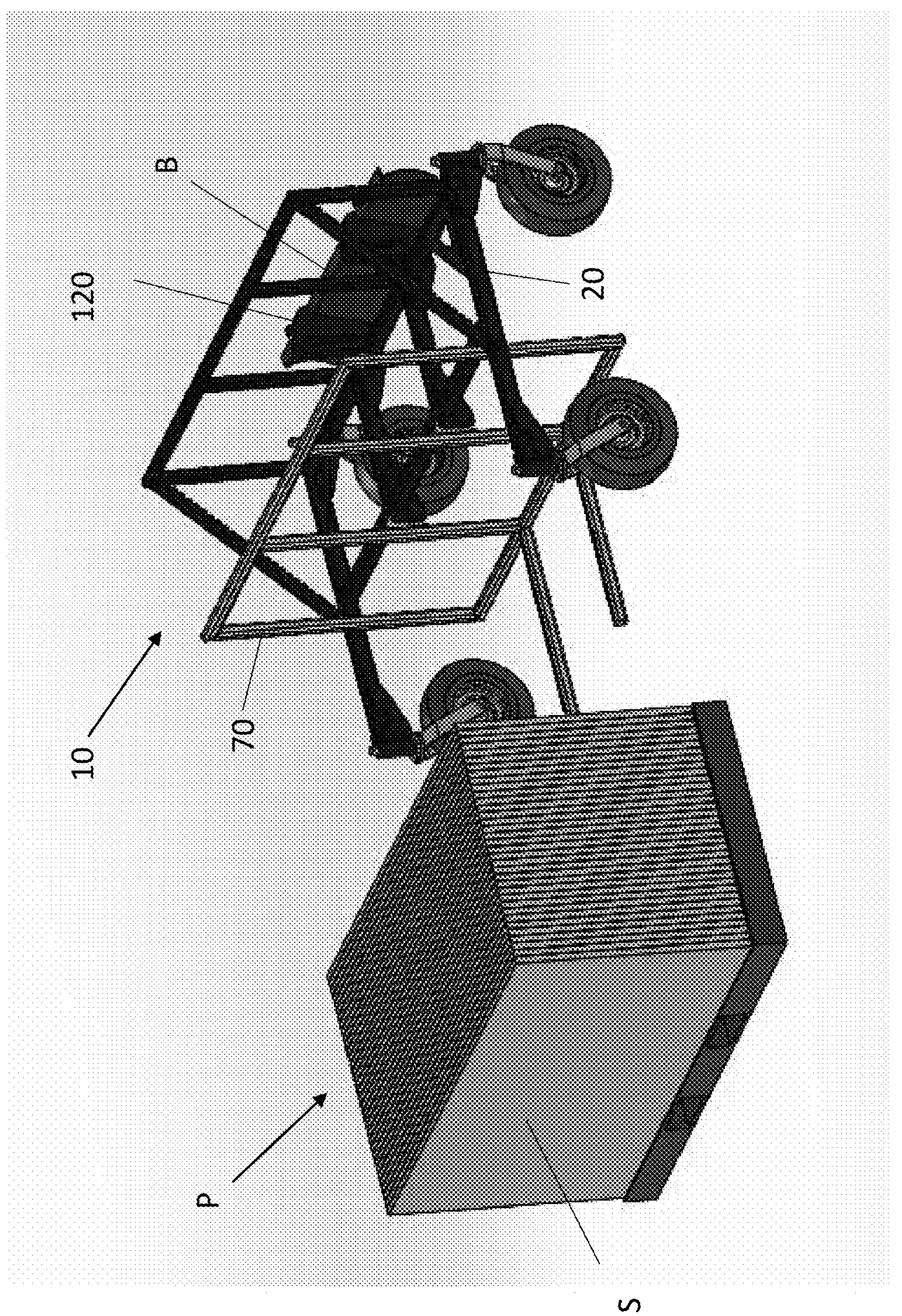
FIG. 9 is a view of an embodiment of a trailer of this disclosure that does not include a trailer extension. The trailer is shown with its fork weldment in the vertical position. The trailer is clamped at its rearward end to a host piece of equipment (not shown).
Figure 10:
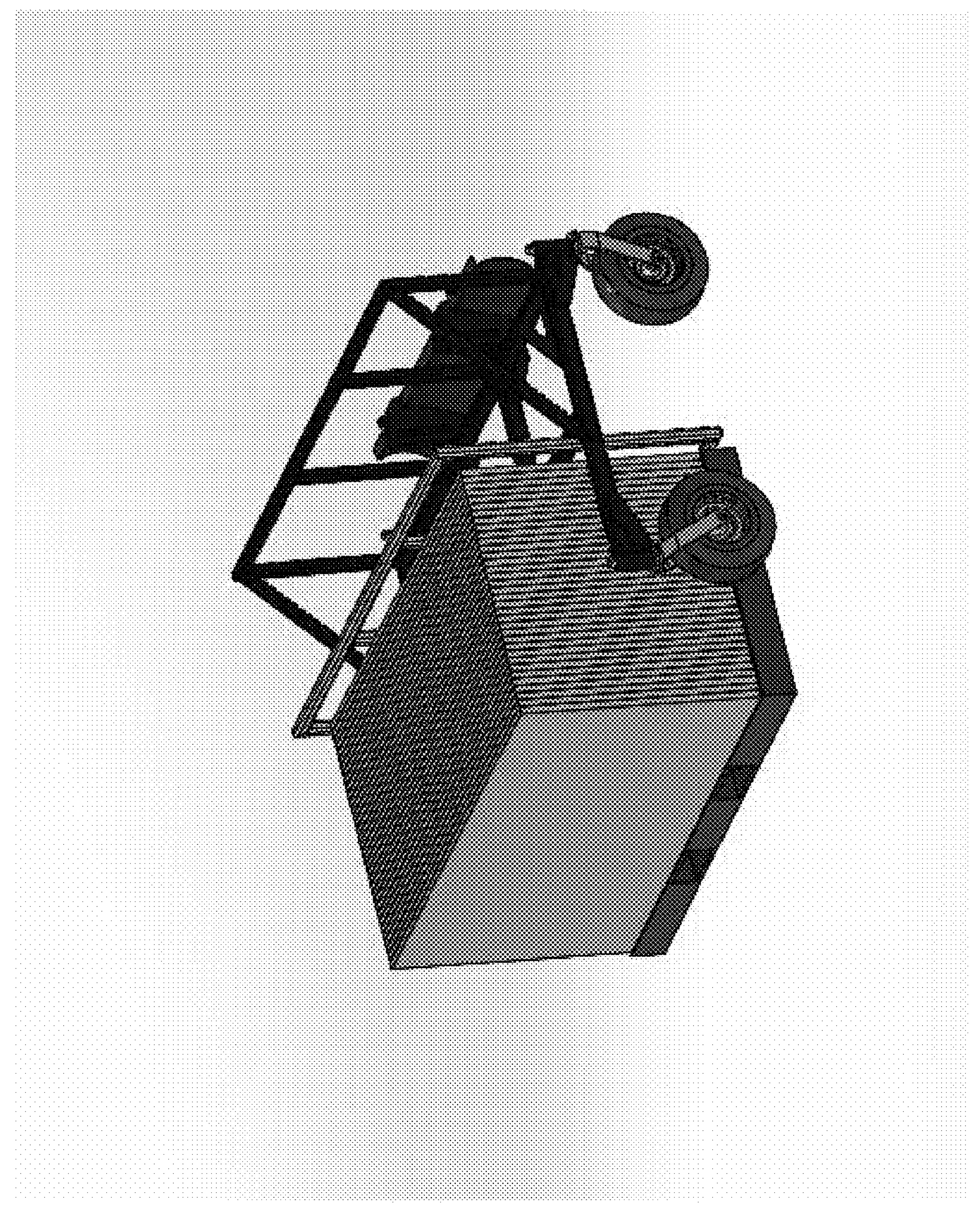
FIG. 10 is a view of the trailer of FIG. 9 with its fork weldment engaged with a palletized bundle of solar panels. This is the deployed position.
Figure 11:
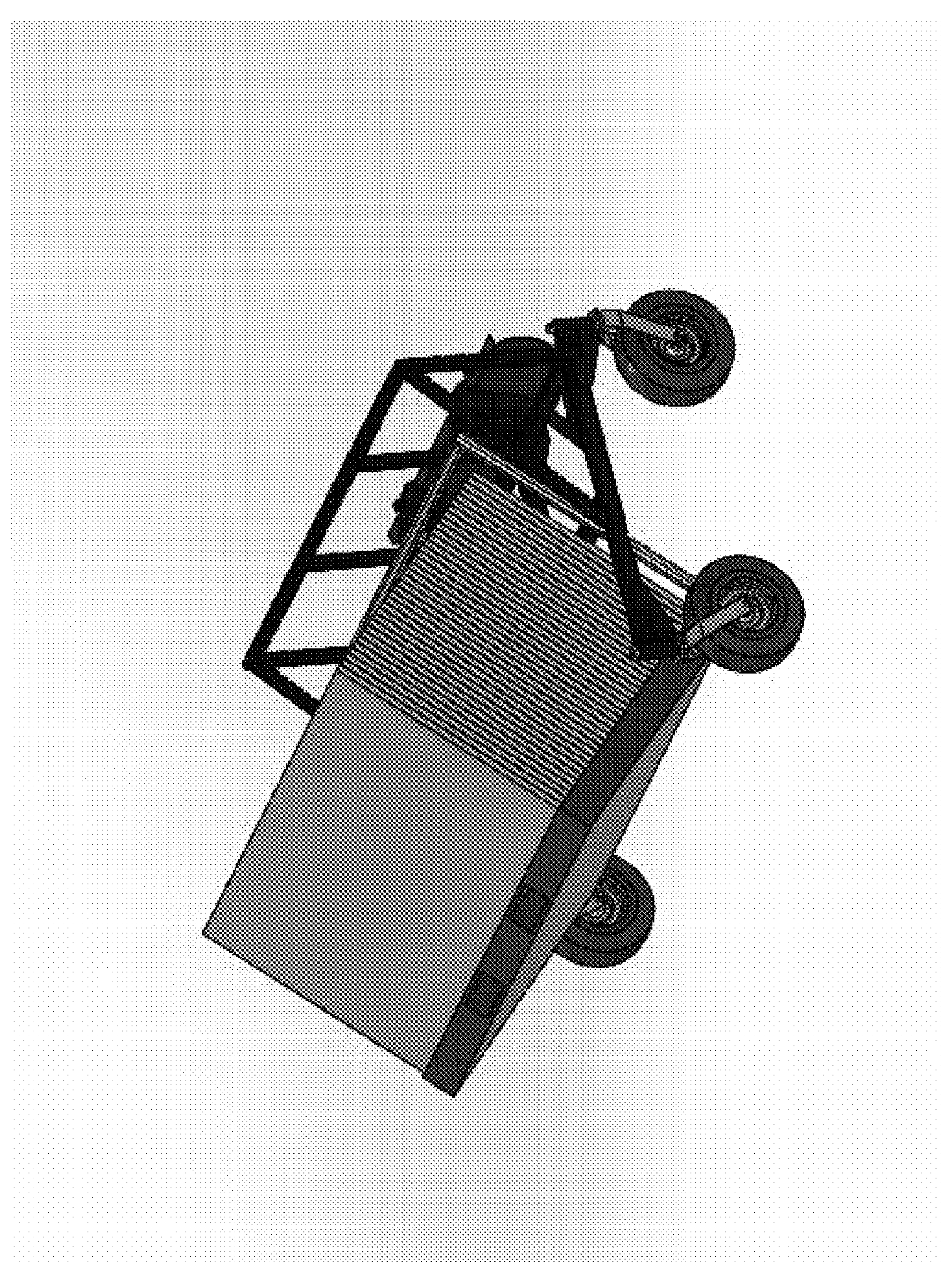
FIG. 11 is a view of the trailer of FIG. 9 as its fork weldment pivots between vertical and horizontal.
Figure 12:
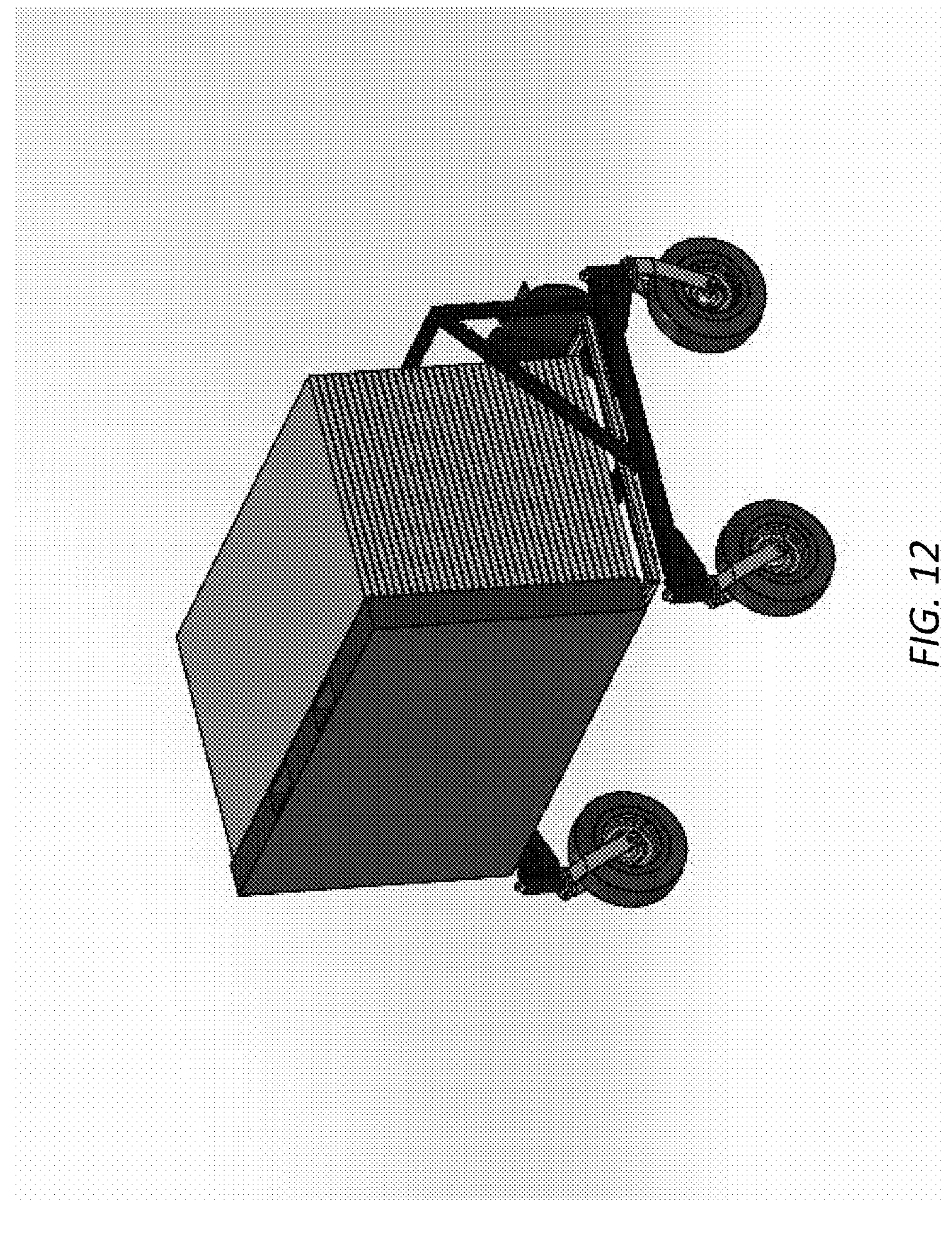
FIG. 12 is a view of the trailer of FIG. 9 with the fork weldment in the horizontal position and the solar panels oriented horizontally for pick and place by a vacuum lifter. This is the stowed position.
Figure 13:
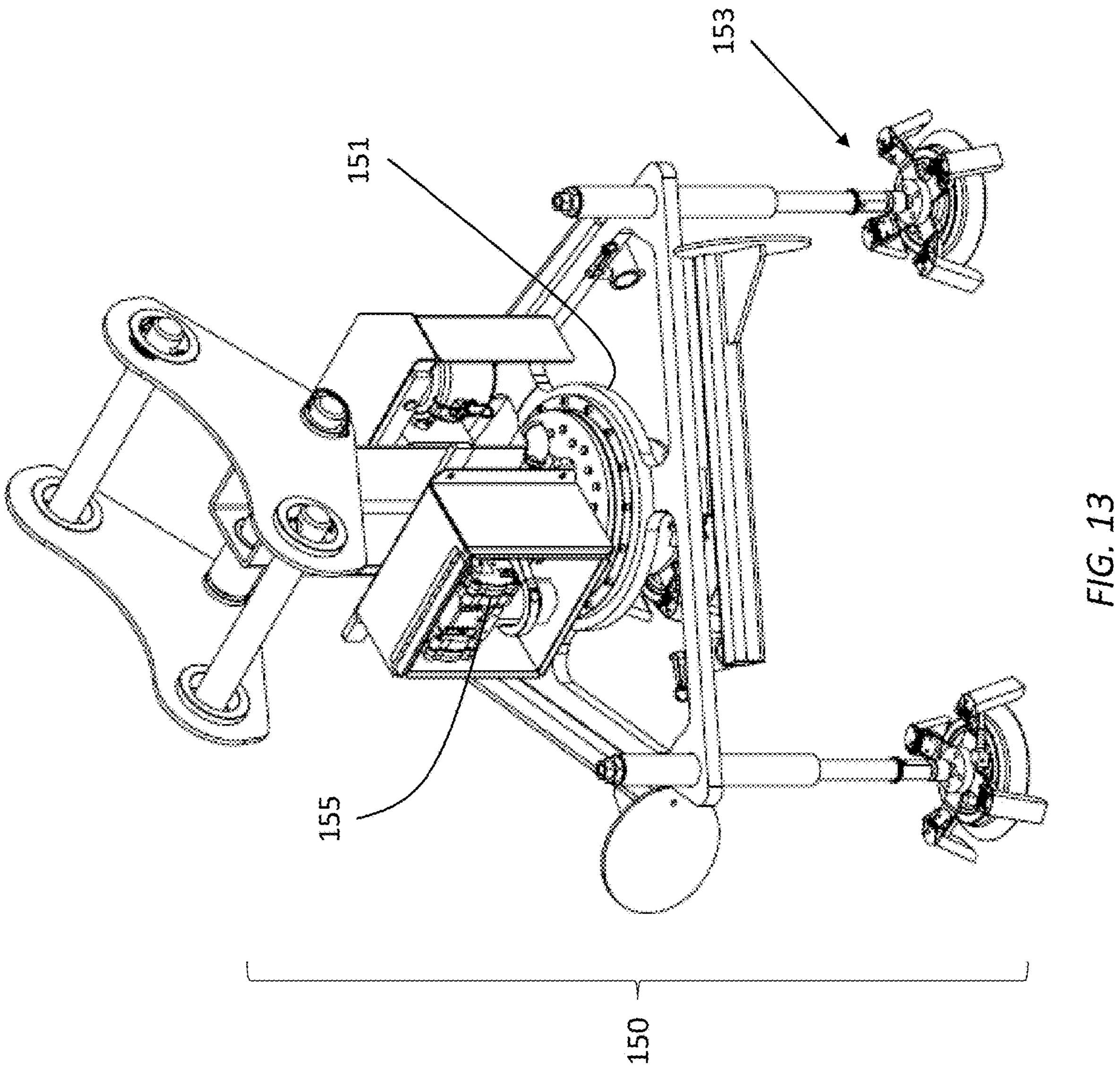
FIG. 13 is an isometric view of an embodiment of a vacuum lifter of this disclosure.
Figure 14:
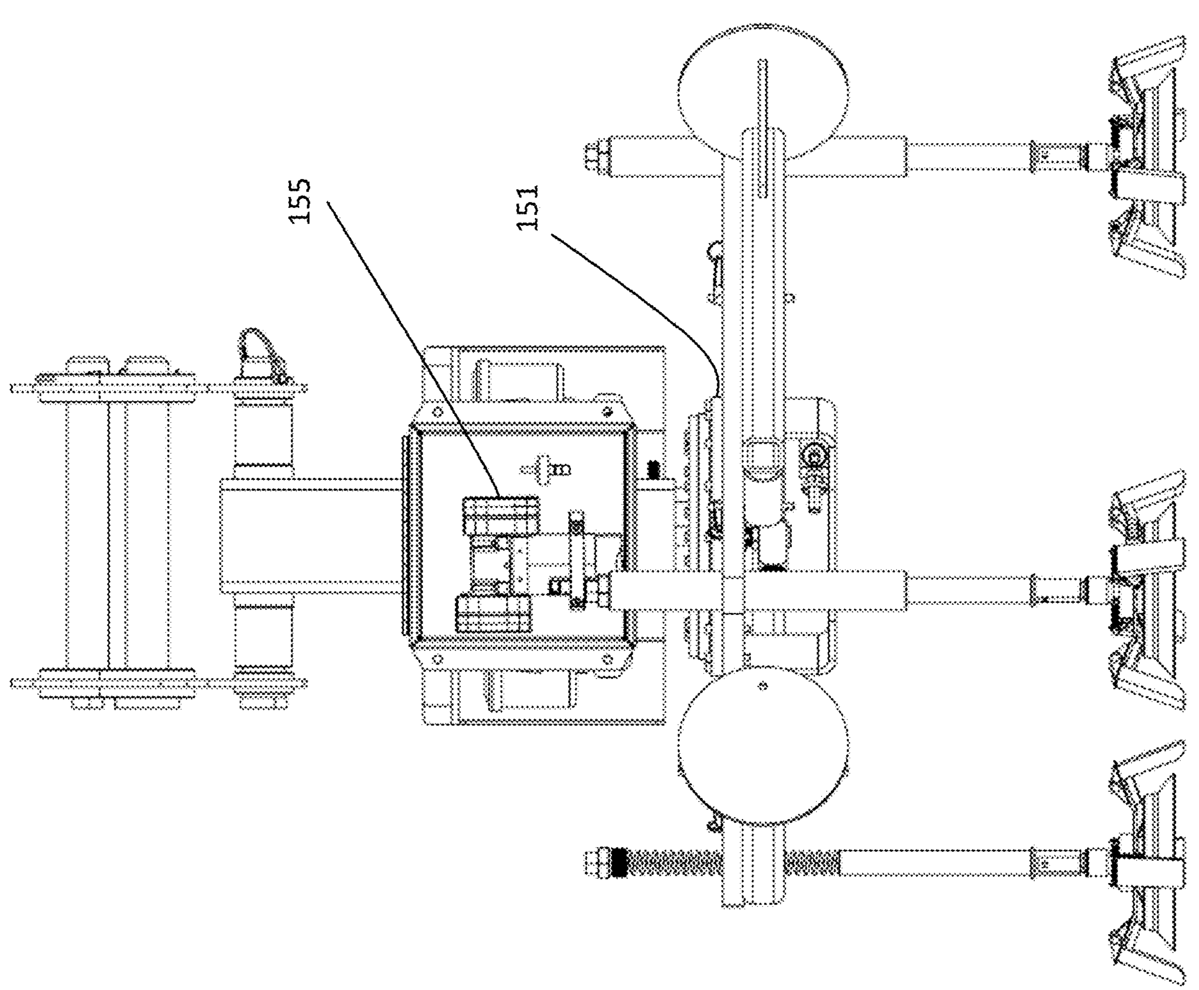
FIG. 14 is a front elevation view of the vacuum lifter of FIG. 13.
Figure 15:
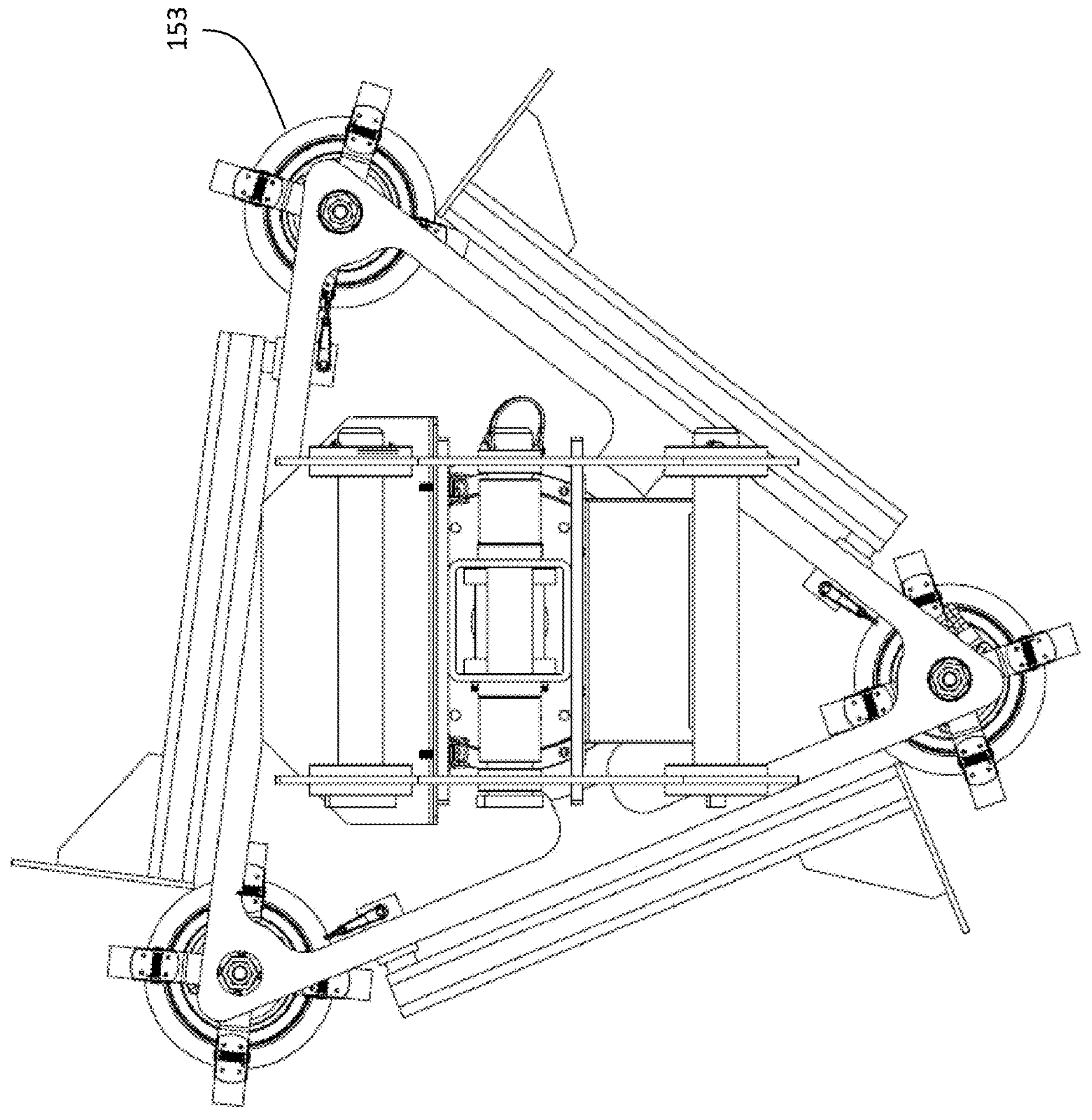
FIG. 15 is a top plan view of the vacuum lifter of FIG. 13.
Figure 16:
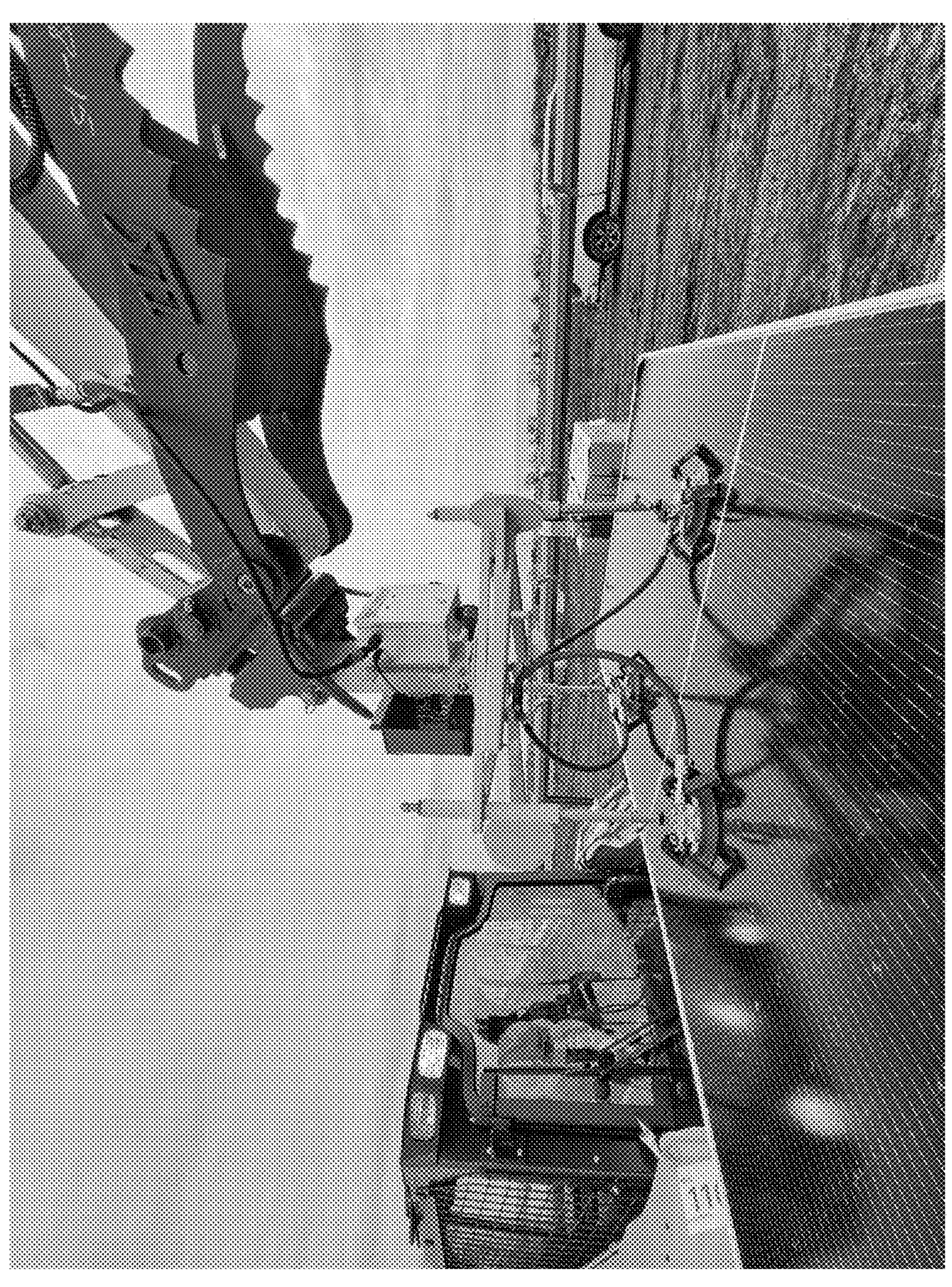
FIG. 16 is a system of this disclosure during tests conducted by the inventors.
Figure 17:
FIG. 17 is an embodiment of a trailer of this disclosure connected to a host piece of equipment.
Figure 18:
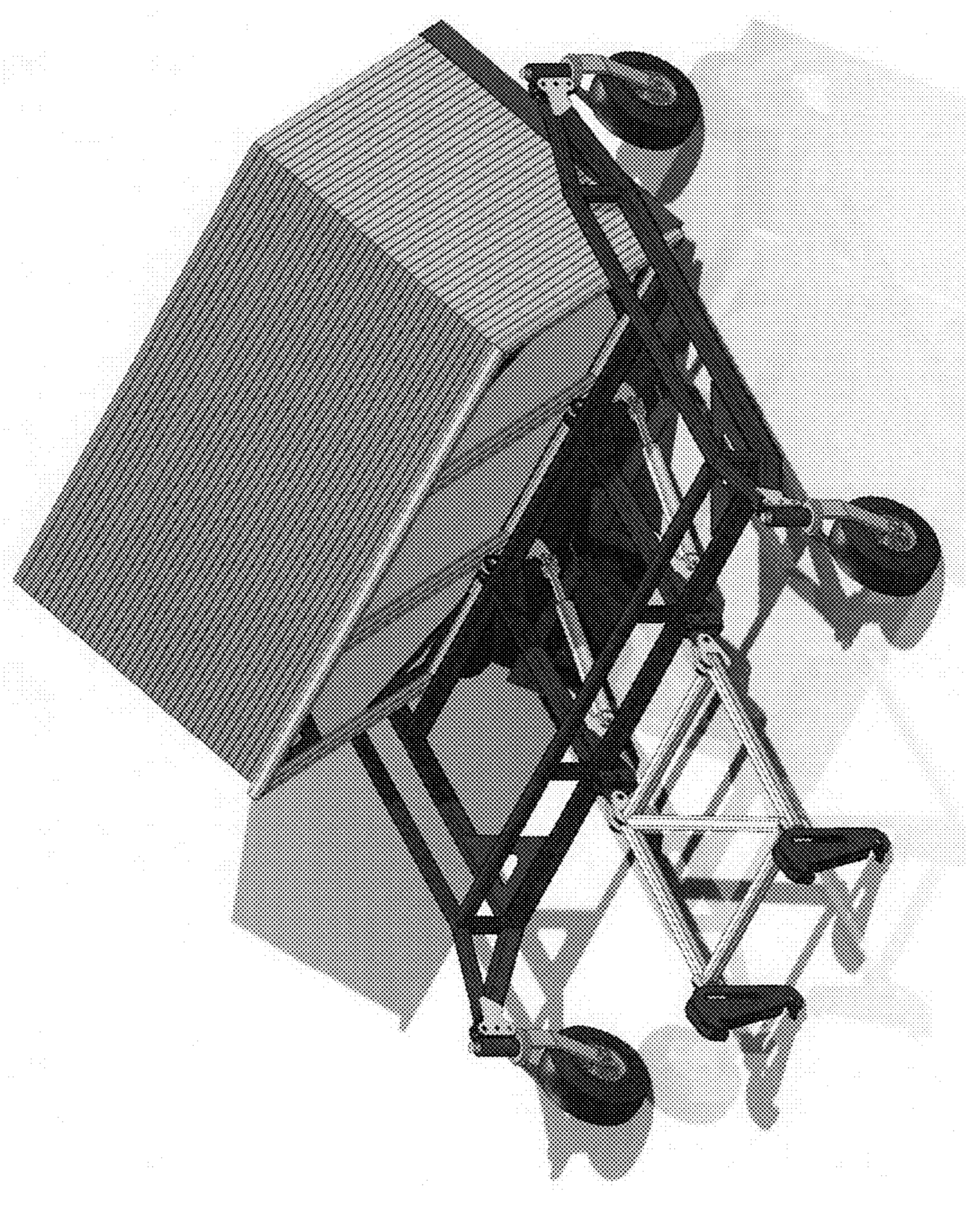
FIG. 18 is a rear isometric view of an embodiment of a trailer of this disclosure as the stack of solar panels is being transitioned from a vertical to a horizontal orientation.

10 Trailer
11 Wheels
20 Fixed trailer frame or fixed platform
21 Front (fork-facing) end
23 Bottom front (fork-facing) rail
25 Bottom rear (host equipment-facing) rail
27 Bottom side rail

31 Rear (host equipment-facing) end
35 Top rear (host equipment-facing) rail
37 Top side rail
41 Gusset
42 Vertical cross member
43 Swivel mount
45 Bracket
47 End
50 Cross-member
51 Bracket
53 Pivot point (pin)
55 Bracket (tilt hinge)
57 Cylinder (rod end) connection
59 Bracket
60 Cylinder (blind end) connection
63 Bracket
64 Pivot mount
69 Adjustable stop bracket
69*a* Adjustment hole
70 Pivoting or tilting frame or platform
71 Front (fork-facing) end and lower end when vertical
73 Front (fork-facing) rail/bottom rail when tilting frame is vertical
75 Rear (equipment-facing) rail/top rail when tilting frame is vertical
77 Side rail
81 Rear (host equipment-facing) end and upper end when vertical
83 Fork
85 Cross member
91 Gusset
100 Trailer extension
101 Front (trailer-facing) end
103 Front (trailer-facing) rail
105 Rear (host equipment-facing) rail
107 Side rail
109 Diagonal cross member
111 Rear (host equipment-facing) end
113 Rail end/connector
120 Clamp
121 Clamping end or face (open end)
123 Swivel trailer
125 Middle plate
127 Top end
129 Bottom end
140 Hydraulic cylinder
141 Blind end or cap end
143 Rod end
150 Vacuum lifter
151 Slewing bearing
153 Vacuum pads
155 Vacuum pump
B Blade of host piece of equipment
F Forward end of host piece of equipment
P Palletized bundle of solar panels
S Solar panel

DESCRIPTION

A system and method of this disclosure combine a vacuum lifter 150 connectable to an electric power circuit of a host piece of equipment and a trailer 10 also connectable to the host piece, or another host piece, of equipment and its hydraulic fluid circuit. The trailer 10 includes a fixed frame 20 and a tilting frame 70 having forks 83. The tilting frame 70 pivots between a horizontal and vertical position as a pair of hydraulic cylinders 140 carried by the fixed frame 20 extend and retract. The vacuum lifter 150, trailer 10, and host piece of equipment work in unison as the vacuum lifter 150 removes solar panels S from the trailer 10 and the host piece of equipment advances the trailer 10 along a solar frame rack or array.

The vacuum lifter 150 of this disclosure includes a slewing bearing 151, a vacuum pump 155 connectable to the electrical power circuit of the host piece of equipment, and at least two spring-loaded, disc-shaped, vacuum pads 153 each in fluid circuit relation with the vacuum pump 155. In some embodiments, the vacuum lifter 150 includes three spring-loaded, disc-shaped vacuum pads 153.

The vacuum lifter 150 is connected to a vacuum lifting attachment of the host piece of equipment. The connection can be via a single pin so the vacuum lifter 150 pivots into, and remains, horizontal during lifting operations. The vacuum lifter 150 is sized to lift a single, horizontally oriented solar panel S from a stack of solar panels P. A range of different predetermined sizes of solar panels S may be handled by the vacuum lifter 150 or the lifter 150 may be designed for use with a single predetermined size of solar panel S. The slewing bearing 151 helps rotate the panel S where needed into proper alignment for installation onto the solar frame rack.

The trailer 10 of this disclosure includes a fixed frame 20 and a tilting frame 70, the tilting frame 70 having forks 83 at its forward end 71. Each frame 20, 70 may be made of square tube joined by welds. Gussets 41, 91 may be provided in the corners for strength.

A host equipment-facing end 31 of the fixed frame 20 is connectable to a forward end F of the host piece of equipment. This host equipment-facing end 31 may include a pair of clamps 120 adapted or sized for connection to a blade B of the host piece of equipment. The clamps 120 may include a middle plate 125 that provides a swivel trailer 123 that connects to a clamping or open end 121 that faces the host equipment. Each clamp 120 may be lowered or raised in the vertical direction, with a top end 127 and a bottom end 129 of each clamp 120 resting on or hooking onto the blade B. The blade B may be raised to cantilever the trailer 10 as needed. In some embodiments, the trailer 10 includes an extension 100 that provides the clamps 120 or the connection.

The trailer extension 110, which may be constructed of square tube, includes a trailer-facing rail 103, a host equipment-facing rail 105, and side rails 107. A diagonal cross member 109 may be used to provide additional support. The side rails 107 each include A trailer-facing end 101 of the extension 110 may be pivotally connected or mounted to the fixed frame 11 at its host equipment-facing end 31 by way of a bracket 63 that provides a pivot mount 64 . . . . The host equipment-facing end 111 of the extension 110 includes the clamps 120.

The tilting frame 70 may include a top rail 75, a bottom rail 73, and side rails 77, the top rail 75 being a host equipment-facing end 81 when the frame 70 is horizontal and an upper end when the frame 70 is vertical, the bottom rail 73 being an fork-facing end 71 when the frame is horizontal and lower end when the frame 70 is vertical. Cross members 85 may span between the rails 73, 75. The forks 83 connect to the rail 73.

The tilting frame 70 is pivotable through 90° by lifting cylinders 140. The cylinders 140 are connectable by way of lines known in the art to the hydraulic fluid circuit of the host piece of equipment. The lifting cylinders 140 may run off the auxiliary or power take off of the host piece of equipment. The lifting cylinders 140 include a blind end 141 and a rod end 143. The blind end 141 of each cylinder 140 is connected to a corresponding one of pair of brackets 59 of the fixed frame 20. The rod end 143 of each cylinder 140 is connected to a corresponding one of a pair of brackets 55 of the tilting frame 70. The bracket 55 also includes a pivot point 53 where it connects to a bracket 51 of the fixed frame 70.

In a deployed position of the tilting frame 70, the cylinders 140 retract to tilt the frame 70 upward and place the forks 83 horizontal to engage a palletized bundle B of solar panels S. When the pallet B is secured by the forks 83, the cylinders 140 extend and the frame 70 tilts back to a stowed position in which the forks 83 are vertical, the palletized bundle B now resting on the trailer 10 and the solar panels S transitioned from their vertical orientation into a horizonal one for individual lifting by the vacuum lifter 150.

An adjustable stop bracket 69, located between the titling and fixed frames 20, 70 stops the tilting frame 70 from going all the way flat (parallel to the fixed frame 20) to prevent the now tilted and loose solar panels from migrating off the tilting frame 70 on their own. The height of the stop bracket 69 (and therefore the tilt angle of the frame 70) is adjustable by selecting which orientation or adjustment hole 69*a* of the adjustable stop bracket 69 is selected by a user. By way of a non-limiting example, in one embodiment the stop bracket 69 provides about 6 inches of vertical adjustment and includes four holes 69*a* (and therefore four heights and corresponding tilt angles). Each adjustment hole 69*a* of the plurality of adjustment holes 69*a* place the tilting frame 70 at height and tilt angle relative to the fixed frame different than other adjustment holes 69*a* of the plurality, the tilt angle being an oblique angle. In embodiments, when the titling frame 70 is in the generally horizontal orientation, its rearward end 81 is higher in elevation than its forward end 71.

The fixed frame 20 may include a top rail 37 and a bottom rail 27 along its sides, a top rail 35 and a bottom rail 25 along an equipment-facing end 31 of the frame 20, and a bottom rail 23 along a fork-facing end 21 of the frame 20, there being no top rail along the fork-facing or pallet-facing end 21 of the frame 20. Vertical rails 42 can be used to connect the top and bottom rails 37, 27 and 35, 25 along their length, and the top and bottom side rails 37, 27 may meet at each end 47 to provide a bracket 45 to receive swivel mounts 43 for wheels 11. In embodiments, the swivel mounts 43 are located forward and rearward of the trailer ends 21, 31. In other embodiments, the trailer 10 may include tracks in place of wheels 11 or may be a skid or sled having runners and no wheels.

The pair of brackets 55 serves as a tilt hinge for the tilting frame 70, each bracket 55 of the pair being connected to a fork-facing end 21 of a corresponding cross member 50 of the fixed frame 20. Bracket 55 provides the rod end cylinder mount 57 as well as the pivot point 53 where the bracket 55 connects to the fixed frame 20 by way of a pinned connection to bracket 51. Another pair of brackets 59 serves as a the blind end cylinder mount 60, each bracket 55 of the pair being connected toward the host equipment-facing end 31 of a corresponding one of the cross members 50.

The host piece of equipment serves as the means to move the trailer 10 as well as provide power to the vacuum lifter 150 and hydraulic fluid to the lifting cylinders 140. In some embodiments, the host piece of equipment may be an excavator. In other embodiments, the host piece of equipment is a skid steer. The host piece of equipment may be wheeled or tracked. The electrical power circuit may comprise a battery of the host piece of equipment.

What is claimed:

1. A system adapted for installing solar panels onto an array, the system comprising:

a vacuum lifter (150) including a slewing bearing (151); at least two spring-loaded, disc-shaped vacuum pads (153); and a vacuum pump (155); and a trailer (10) including:

a fixed frame (20) having a pair of tilt hinges (55) at a forward end (21) of the fixed frame;

a tilting frame (70) having a rail (73) connected to the pair of tilt hinges, the rail including a pair of forks (83);

a pair of lifting cylinders (140) having a blind end (141) and a rod end (143), the blind end connected to the fixed frame, the rod end connected to a corresponding one of the pair of tilt hinges, and a pair of clamps (120) located at a rearward end (31) of the trailer and pivotally connected to the rearward end, an open end (121) of each clamp facing away from the rearward end;

the tilting frame moveable through an arc between a stowed position and a deployed position as the pair of lifting cylinders extend and retract.

2. The system of claim 1, further comprising an adjustable stop (69) located between the fixed and tilting frames, the adjustable stop including a plurality of adjustment holes (69*a*), each adjustment hole of the plurality placing the tilting frame at height and tilt angle relative to the fixed frame different than other adjustment holes of the plurality, the tilt angle being an oblique angle.

3. The system of claim 1, wherein the open end of each clamp is adapted for connection to a predetermined host piece of equipment.

4. A system adapted for installing solar panels onto an array, the system including a trailer comprising:

a fixed frame (20) having a pair of tilt hinges (55) at a forward end (21) of the fixed frame;

a tilting frame (70) having a rail (73) connected to the pair of tilt hinges, the rail including a pair of forks (83);

a pair of lifting cylinders (140) having a blind end (141) and a rod end (143), the blind end connected to the fixed frame, the rod end connected to a corresponding one of the pair of tilt hinges, and a pair of clamps (120) located at a rearward end (31) of the trailer and pivotally connected to the rearward end, an open end (121) of each clamp facing away from the rearward end;

the tilting frame moveable through an arc between a stowed position and a deployed position as the pair of lifting cylinders extend and retract.

5. The system of claim 4, wherein the open end of each clamp is adapted for connection to a predetermined host piece of equipment.

6. The system of claim 4, further comprising a vacuum lifter (150) including a slewing bearing (151); at least two spring-loaded, disc-shaped vacuum pads (153); and a vacuum pump (155), the vacuum lifter adapted for connection to the predetermined host piece of equipment.

7. A method for installing solar panels onto an array, the method comprising:

connecting a vacuum lifter (150) to a power circuit of a host piece of equipment, the vacuum lifter including a slewing bearing (151); at least two spring-loaded, disc-shaped vacuum pads (153); and a vacuum pump (155); and connecting a rearward end (31) of a trailer (10) to the host piece of equipment, the trailer including:

a fixed frame (20) having a pair of tilt hinges (55) at a forward end (21) of the trailer;

a tilting frame (70) having forks (83) and connected to the pair of tilt hinges;

a pair of lifting cylinders (140) having a blind end (141) and a rod end (143), the blind end connected to the fixed frame, the rod end connected to a corresponding one of the pair of tilt hinges, and a pair of vertically oriented clamps (120) located at the rearward end of the trailer and pivotally connected to the rearward end, an open end (121) of each clamp facing away from the rearward end;

connecting the pair of hydraulic lifting cylinders to a hydraulic fluid circuit of the host piece of equipment;

moving the trailer by way of the host piece of equipment to a palletized bundle of solar panels and engaging the forks with the palletized bundle, each solar panel of the palletized bundle being oriented vertically;

lifting the palletized bundle of solar panels through an arc by actuating the pair of lifting cylinders of the trailer, each solar panel of the palletized bundle after the lifting being in a generally horizontal orientation; and using the vacuum lifter to lift each solar panel and rotate the lifted solar panel through an arc and into alignment for attachment to the array.

8. A solar panel trailer (10) for use during installation of solar panels onto an array, the solar panel trailer comprising:

a fixed frame (20) having a pair of tilt hinges (55) at a forward end (21) of the trailer;

a tilting frame (70) having forks (83) and connected to the pair of tilt hinges;

a pair of lifting cylinders (140) having a piston end (141) and a rod end (143), the piston end connected to the fixed frame, the rod end connected to a corresponding one of the pair of tilt hinges, and a pair of vertically oriented clamps (120) located at a rearward end (31) of the trailer and connected to the rearward end, an open end (121) of each clamp facing away from the rearward end;

the tilting frame having a stowed position and a deployed position as the pair of lifting cylinders extend and retract.

9. The solar panel trailer of claim 8, further comprising an adjustable stop (69) located between the fixed and tilting frames at a rearward end of the fixed frame, the adjustable stop including a plurality of adjustment holes (69*a*), each adjustment hole of the plurality placing the tilting frame at height and tilt angle relative to the fixed frame different than other adjustment holes of the plurality, the tilt angle being an oblique angle.

10. The solar panel trailer of claim 8, wherein the open end of each clamp is adapted for connection to a predetermined host piece of equipment.

* * * * *